March 15, 1955  J. HERTRICH  2,704,157
SPEED CONTROL SYSTEM FOR CENTRIFUGALS AND OTHER MACHINES
Filed Nov. 30, 1946  2 Sheets-Sheet 2
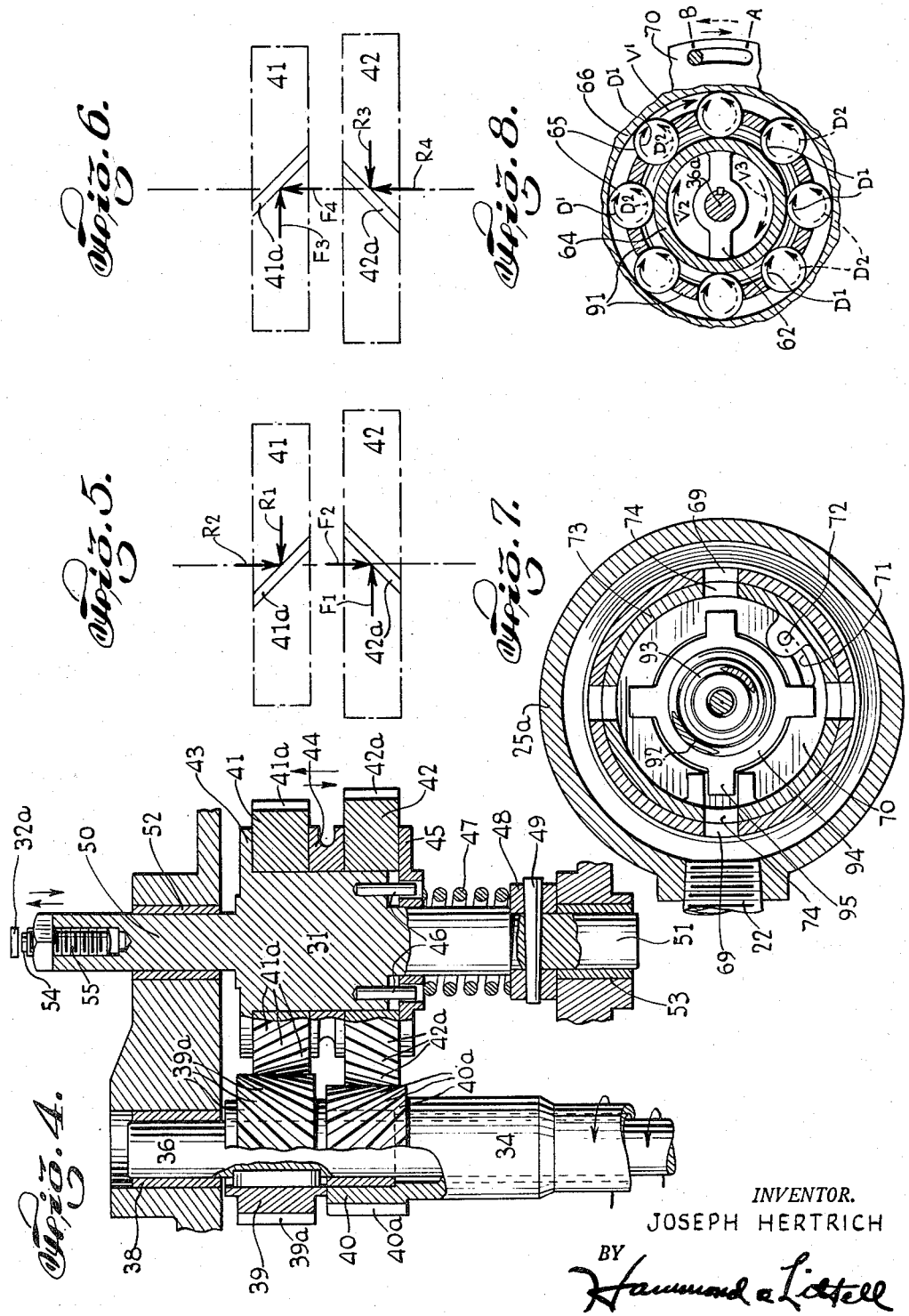
INVENTOR.
JOSEPH HERTRICH
BY
Hammond a Littell
ATTORNEYS

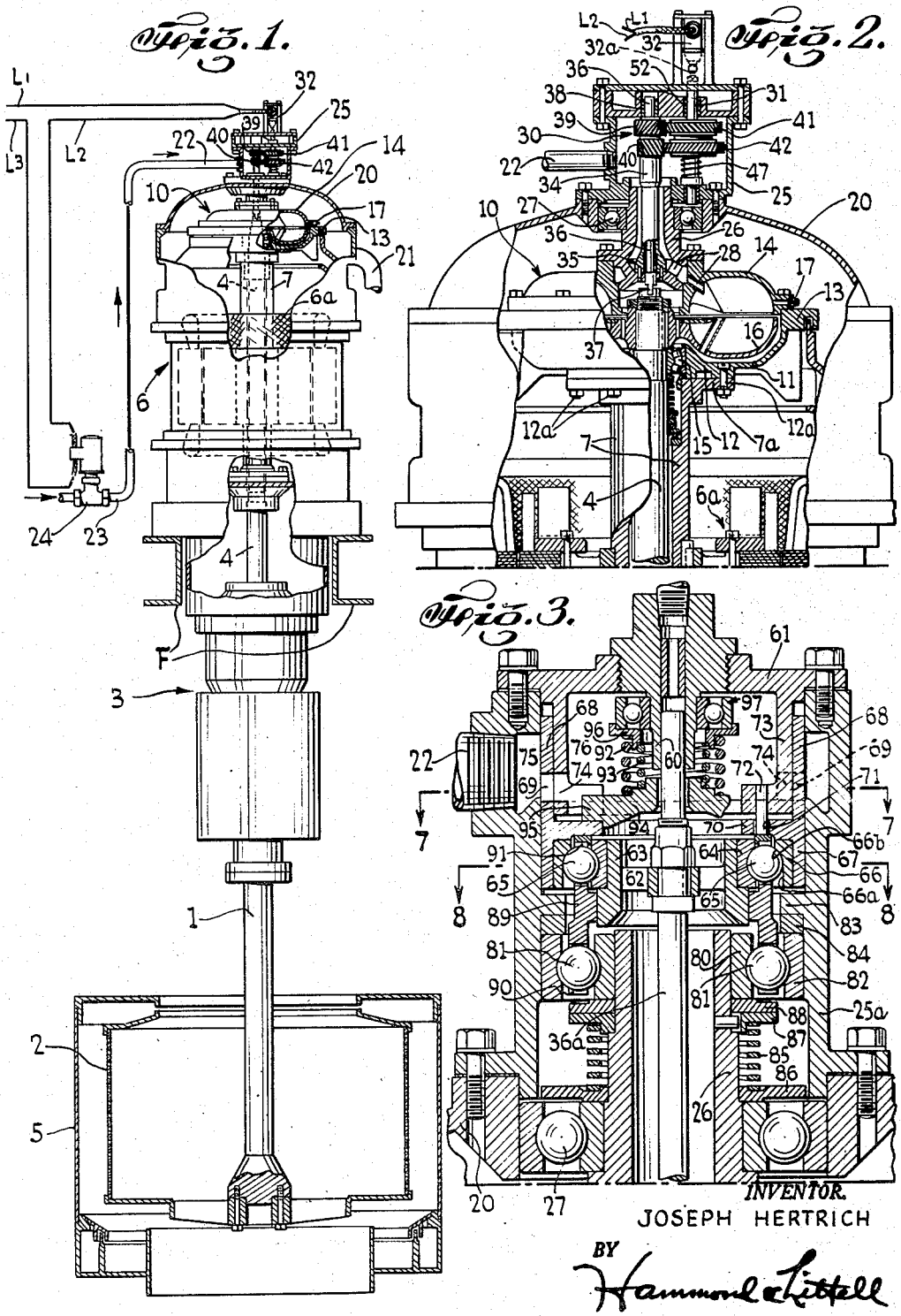

United States Patent Office 2,704,157
Patented Mar. 15, 1955

2,704,157

SPEED CONTROL SYSTEM FOR CENTRIFUGALS AND OTHER MACHINES

Joseph Hertrich, Hamilton, Ohio, assignor to The Western States Machine Company, Hamilton, Ohio, a corporation of Utah Application November 30, 1946, Serial No. 713,329

13 Claims. (Cl. 210—72)

This invention relates to speed control combinations for the driving systems of centrifugals and other rotary machines and to speed-responsive control mechanisms useful therein and for other purposes.

Centrifugals and other heavy rotary machines often are driven by A. C. induction motors, either through a direct connection between the driven shaft and the motor or driving shaft or through a slip coupling therebetween, such as a mechanical clutch or a hydraulic coupling. In existing machines of this nature the full operating speed is dependent upon the rated speed of the driving motor. The A. C. induction motors designed for driving heavy centrifugal machines usually have rated speeds of either 1200 or 1800 R. P. M., so that the full running speeds available from these machines when under load are usually in the neighborhood of about 1150 or 1750 R. P. M.

Among the important uses of such machines is the centrifugal separation of syrup from sugar. It is a well known fact that the efficiency of this separation is affected by the speed, hence the centrifugal force, of the running machine, as well as by other factors such as the characteristics of the mixture being treated. For different grades of massecuite or magma it often is desired to use different centrifugal speeds, yet in many cases the desired full speed does not correspond to any that is available from the motor-driven machines. Although speed-changing gears might be incorporated in the torque transmissions of such machines to alter them for operation at the desired speed, this is seldom if ever done, being objectionable because of the expense, the serviceability or the space requirements of the resultant combination.

One of the objects of this invention is to provide a centrifugal machine driven by an A. C. induction motor as above mentioned with control means through which the driving torque is not transmitted to the machine but by which the full running speed of the machine is set at a predetermined value below the full running speed of the driving motor and having a desired predetermined ratio thereto.

Another object is to provide a rotary machine combination whereby the speed of a driven shaft of the machine as imparted from its driving system is limited to a maximum value bearing a predetermined ratio to the speed of a rotary controlling shaft, though the speed of the machine can vary as needed over all lower values within the capacity of the driving system. The controlling shaft in this combination may be rotated by the driving shaft of the driving system in cases where its torque is transmitted to the driven shaft through a slip coupling, such as a hydraulic coupling, that gives a varying speed ratio between the two shafts under operating conditions. In cases where the machine is driven at speeds bearing a constant ratio to the speed of the driving shaft, such as by a directly connected motor, the controlling shaft may be rotated separately by its own small motor or otherwise.

A further object of this invention is to provide speed control mechanisms which respond to the relative angular speeds of two differentially rotated shafts so as to cause a controlling movement to occur when the speed of one of the shafts exceeds a predetermined ratio to the speed of the other.

According to this invention, the relative speeds of two differentially rotated elements are utilized through a mechanism which responds to their differing ratios of speed so as to create a directional force or reaction in one direction when the angular speed of one of the elements lies below a predetermined ratio to the angular speed of the other element, and so as to reverse the direction of this force or reaction when the speed of the one element exceeds that ratio. Through appropriate construction of this speed-responsive mechanism the directional force or reaction created by it is made to move or control the position of a reciprocable element which in turn is utilized for controlling a desired motion, condition or effect.

By using the driven shaft of a machine to rotate the one element, using the motor or driving shaft of the machine to rotate the other element, providing a slip coupling such as a clutch or hydraulic coupling in the torque transmission between these shafts so that the speed of the driven shaft varies in relation to that of the motor under various load conditions, and using the reciprocable element of the speed-responsive mechanism to position a control device so that it either establishes or interrupts a connection necessary for the delivery of driving torque to the machine, an economical and effective combination may be obtained whereby the speed of the driven shaft is limited to a maximum value bearing any desired predetermined ratio to the speed of the driving shaft.

Further, an advantageous combination is provided for cyclically-operated, motor-driven centrifugal machines, such as those used for the manufacture of sugar, by driving the machine through a hydraulic coupling from a polyphase induction motor that normally operates at substantially its full running speed and employing the speed-responsive mechanism with connections from its rotary elements to the driven machine shaft and the motor shaft, respectively, so that its reciprocable element will cause a drive controlling movement, such as the closing of a valve in a liquid supply system for the hydraulic coupling, when the machine has been accelerated in each operating cycle to a desired predetermined maximum speed below the motor speed. In this way the machine is made to run at a speed desired for the centrifugal treatment of a particular grade of material, though it be driven by a motor that runs at a substantially higher speed. Thus the running speed of the machine is not confined to that of the driving motor.

Other objects, features and advantages of my invention will appear from the following detailed description of exemplary embodiments thereof and from the accompanying drawings illustrating said embodiments.

In the drawings,

Fig. 1 is a vertical assembly view, partly in elevation and partly in section, of a suspended centrifugal machine comprising a preferred embodiment of the invention;

Fig. 2 is an enlarged elevation, partly in section, of the upper part of the structure in Fig. 1, showing a preferred arrangement of speed-responsive control mechanism with driving and driven shafts and with a hydraulic coupling to transmit torque between these shafts;

Fig. 3 is a view, partly in elevation and partly in section, of the top part of a centrifugal combination like that of Fig. 1 wherein another form of speed-responsive control mechanism is used;

Fig. 4 is an enlarged vertical section, partly in elevation, of the speed-responsive mechanism appearing in Fig. 2;

Figs. 5 and 6, respectively, are diagrams illustrating directional forces existing in the mechanism of Fig. 4 under different speed conditions;

Fig. 7 is a section taken approximately along line 7—7 of Fig. 3;

Fig. 8 is a diagrammatic view of elements in the construction of Fig. 3, corresponding in part to a section along line 8—8 of that figure.

Referring first to the general arrangement of Fig. 1, the centrifugal machine there shown comprises a suspended spindle 1 carrying a centrifugal basket 2 at its lower end and directly connected, through a flexible coupling in a gyratory head 3 of any suitable known construction, with the driven shaft 4 of a rotary driving system disposed above the supporting framework F. The basket 2 is surrounded by a stationary casing or curb 5.

The driving system includes a suitable polyphase induction motor 6 having a hollow driving shaft 7 to which the rotor 6a is keyed. This driving shaft extends upward to a slip connection with the upper end of the driven shaft 4 through a hydraulic coupling designated generally at 10. The hydraulic coupling (Fig. 2) has a rotary housing 11 providing a hub portion 12 and a peripheral portion 13 that is joined to and rotates with the impeller or driving element 14. The hub portion 12 is joined by bolts 12a or otherwise to a flange 7a on the upper end of the driving shaft 7, and a spherical bearing 15 between the hub portion and the upper end of driven shaft 4 holds these parts in proper coaxial relation.

The runner or driven element 16 of the hydraulic coupling is secured to the upper end of the driven shaft 4 and disposed within the housing 11, in facing relation to the impeller 14, so that torque will be transmitted between the two coupling elements, hence from the driving shaft 7 to the driven shaft 4, in well known manner when the motor 6 is operating and liquid is present in the vortex chamber defined between the coupling elements.

Since the system illustrated is adapted for intensive cyclical operation, with acceleration of the loaded centrifugal from a low or zero speed to a high running speed at frequent intervals, provisions are made for circulating liquid into and out of the hydraulic coupling in order that the heat generated by slippage between the coupling elements may be dissipated, and for other purposes. These provisions may be utilized also for establishing and disconnecting the transmission of torque from the driving motor to the driven machine, in which case that function does not require switching off and on the current supply to the driving motor 6 and the motor can be kept running while the centrifugal is slowed down and stopped for unloading and reloading.

For example, the impeller-housing assembly is provided with liquid discharge ports as at 17 in Figs. 1 and 2, through which the oil or other coupling liquid is discharged continuously by centrifugal force, when the motor is running, into a stationary casing 20 atop the motor 6. The liquid collected in casing 20 is drawn off through an outlet 21 to a recirculation and cooling system of known nature (not shown), from which the liquid may be returned to the coupling through a feed conduit 23 (Fig. 1) and an inlet 22. A control valve 24 is provided on the feed conduit to open and close it, preferably an electrically motivated solenoid valve of well known construction. Consequently, a condition of torque transmission from the running motor to the centrifugal machine is established when the valve 24 is open to inlet 22 and is interrupted by the emptying of the coupling through ports 17 when valve 24 is closed.

The inlet 22 leads into the hydraulic coupling 10 through a housing 25 fixed to the top of casing 20, a hollow stub shaft 26 secured at its lower end to the impeller 14 and supported on bearings 27 in casing 20, and a radial port or ports 28 extending from this hollow stub shaft into the vortex chamber of the hydraulic coupling.

The housing 25 encloses the speed responsive control mechanism 30, which is so connected with the driving and driven shafts 7 and 4, respectively, and is so responsive to their relative speeds that a reciprocable element or arbor 31 of this mechanism is held in one position when the speed of the centrifugal lies below a certain ratio to the speed of the motor 6 and is moved to another position whenever the speed of the centrifugal exceeds that certain ratio to the motor speed. The reciprocable arbor 31 has on its upper end portion 50 (Fig. 4) an extremity 54, formed adjustable in height as the head of a set screw 55, which is so associated with a limit switch 32, shown as disposed above the housing 25, that in the one position it allows the limit switch to hold itself closed with the effect of making an electrical connection between lines L₁ and L₂ that closes a circuit to the solenoid valve 24, holding it open to inlet 22, while the shifting of the arbor to its other position moves the limit switch 32 to open the electrical connection and results in the valve 24 being closed. Thus, the one position of the control mechanism corresponds to a condition of effective torque transmission through the slip coupling from the driving motor 6 to the driven shaft 4 and the driven centrifugal machine, while at the other position liquid is exhausted from the coupling and the torque transmission is interrupted. The control mechanism causes its arbor to assume one or the other of these positions, in response to the changing ratios of speed of the driving and driven shafts of the machine, in the manner now to be described, so that the centrifugal may be driven at all speeds within a predetermined range but ceases to be driven whenever its speed exceeds the upper limit of said range. Thus the running speed of the centrifugal is established as the speed at which the control mechanism undergoes a change of position, and this has a constant value in the embodiment shown, where the controlling speed of the motor 6 and driving shaft 7 is substantially constant.

As shown in Fig. 2, a small hollow shaft 34 extends upward through the hollow stub shaft 26 from a connection with the latter at 35 by which these two shafts are caused to rotate together. The small hollow shaft 34 thus rotates with and at the speed of the impeller-housing assembly, the driving shaft 7 and the driving motor. It constitutes the "controlling shaft," as abovementioned, of the illustrative embodiment. A second small shaft 36 extends upward into housing 25 inside the shaft 34, and this inner shaft has a squared lower end 37 which is received in a squared socket at the top of the driven shaft 4, so that it rotates with and at the speed of the driven shaft.

The upper end of the inner shaft 36 is suitably positioned by a bearing 38. To this shaft, below this bearing, a pinion 39 having helical teeth 39a is keyed (see Fig. 4). Below this pinion, to the upper end of the small hollow shaft 34, a second pinion 40 having helical teeth 40a is keyed. The helical teeth of pinion 39 are slanted oppositely to those of pinion 40. In mesh with pinion 39 is a ring gear 41 having helical teeth 41a, and in mesh with pinion 40 is a second ring gear 42 having helical teeth 42a. These two ring gears are mounted coaxially and rotatably upon the arbor or reciprocable element 31, so that they are free to be moved relative to each other by their respective driving pinions, and yet they are provided with interconnecting means to impose a substantial frictional resistance against their relative rotation.

As illustrated, the arbor 31 has a circular flange 43 against which the upper face of gear 41 is positioned; a friction ring 44 is disposed between the two ring gears in face to face contact therewith; an end plate 45, movably centered on pins 46, bears against the lower face of gear 42; and a compression spring 47 is confined between the end plate 45 and a collar 48 therebelow that is pinned at 49 to the arbor. It will be evident that the spring 47 compresses the arbor assembly with a certain force that creates a certain friction between each ring gear and the rest of that assembly, so that a certain frictional resistance will exist against relative movement of the ring gears and will cause them to rotate together at the same angular speed except when they are rotated differentially by their respective driving pinions 39 and 40. The spring 47 is readily selected so that the friction created by its pressure will be of sufficient magnitude to cause a reactive force having an axial component capable of moving and positioning the arbor assembly, as hereinafter explained.

It will be noted that the entire arbor assembly, including the ring gears 41 and 42, has a limited freedom of vertical reciprocatory movement in the space between bearing supports 52 and 53, in which its upper and lower end portions 50 and 51, respectively, are slidably disposed. In Fig. 4 the arbor is shown in its normal lower position with the collar 48 resting against the lower bearing support, in which position the extremity 54 is so disposed that the limit switch 32 holds itself closed. When the arbor assembly is shifted upward, however, it assumes another position limited by the upper bearing support, where its extremity 54 has moved and holds the contact arm 32a of the limit switch 32 in open circuit position. The positioning of the arbor assembly in response to the relative speeds of the rotary driving elements 39 and 40, hence to the relative speeds of the driving system and the driven machine, comes about as follows:

Any differential rotation of the two ring gears 41 and 42 is accompanied by a radial force or tooth load upon their respective helical teeth where they mesh with their driving pinions. This force results from the interconnection of the two gears induced by the pressure of spring 47, and in respect of gear 41 it exists in one direction or the opposite direction, according to whether gear 41 is rotated slower or faster by its pinion than the speed at which it tends to be rotated through its frictional connection with gear 42. A similar but oppositely directed force exists upon the teeth of gear 42 where they bear against the teeth of pinion 40. Since the helical teeth of the respective gears are slanted, however, the directional forces existing upon them have axial as well as horizontal components, and since the respective teeth slant oppositely their respective axial force components result in a common axial direction. In the illustrated form, where the pinions rotate clockwise, as viewed from above, this axial direction is downward when gear 41 turns more slowly than gear 42 and is upward when gear 41 turns faster than gear 42.

Figs. 5 and 6 of the drawings diagram the force components active upon a tooth of each ring gear under these two conditions.

In Fig. 5 gear 42 is being rotated faster by its pinion than gear 41 is rotated by its pinion, so that helical tooth 42a is advanced by its meshing pinion tooth with a force proportional to the frictional drag between the two gears and having a horizontal component $F_1$ and a downward axial component $F_2$. Gear 41 is urged to turn at the same speed as gear 42 by their frictional interconnection, but since its pinion would turn it more slowly it tries to over-run its pinion and a reactive force having a horizontal component $R_1$ and a downward axial component $R_2$ results on gear tooth 41a. Since the two axial components $F_2$ and $R_2$ have a common downward direction, they hold the arbor assembly comprising gears 41 and 42 in its lower position at which the limit switch 32 holds its contacts closed.

In Fig. 6, the speed induced to gear 41 by its driving pinion has exceeded the speed at which gear 42 is rotated by its pinion, so that the directions of the forces resulting upon the gear teeth are reversed. The advancing pressure of pinion 39 against gear tooth 41a, to overcome the frictional drag, produces a horizontal component $F_3$ and an upward axial component $F_4$, while the accompanying tendency of gear 42 to move faster than its pinion 40 produces a reaction upon tooth 42a having a horizontal component $R_3$ and an upward axial component $R_4$. The components $F_4$ and $R_4$ then shift the arbor assembly to its upper position and hold it there for as long as the speed induced to gear 41 by pinion 39 exceeds the speed induced thereto through the frictional interconnection, i. e., as long as gear 41 has an angular speed greater than the angular speed of gear 42.

In the manner above explained, an axial force holding the arbor 31 at its lower or its upper position, as the case may be, is created whenever the speed of the pinion 39 on shaft 36 is below or above a certain predetermined ratio to the speed of the pinion 40 on shaft 34, and in the combination shown these conditions correspond to having the speed of the centrifugal basket 2 below or above a predetermined ratio to the speed of the driving motor 6. The speed ratio below or above which the direction of that axial force changes is predetermined by providing the pinion and gear sets with the desired ratio of teeth. For example, if the gear ratio is six to five, such that six revolutions of pinion 40 and five revolutions of pinion 39 would drive gears 42 and 41, respectively, at the same angular speed, and if the motor 6 runs at 1800 R. P. M., then the arbor is held at its lower position and switch 32 stays closed at all speeds of the driven machine below 1500 R. P. M., and when the machine speed exceeds 1500 R. P. M. the direction of the axial force moving the arbor changes to upward, with the effect of shifting the arbor to its upper position and opening the limit switch. Since this causes interruption of the torque transmission from the motor to the centrifugal machine through the hydraulic coupling, the speed of the centrifugal is in this way limited to a predetermined value, say 1500 R. P. M., below and in fixed relation to the speed of the controlling shaft 34, which in the case shown is the same as the speed of the driving motor.

By the present disclosure, therefore, an automatic control of the speed of the machine is achieved whereby its full running speed in each cycle of operation is held at a desired maximum below and having a predetermined ratio to the speed of its driving motor. This control does not restrict in any way the ability to do or to use whatever is needful for the efficient construction and operation of motor driven centrifugal machines of the type shown, and it does not alter the manner of torque transmission to such machines, though it does add thereto a capacity, hitherto unavailable in practice, of operating in each cycle to a desired full speed quite distinct from the top speed available from an A. C. centrifugal driving motor.

In Figs. 3, 7 and 8 of the drawings I have illustrated another form of speed responsive control mechanism adapted for a combination of the type shown in Figs. 1 and 2. The assembled control mechanism shown in Fig. 3 is to be considered as replacing valve 24 and the structure within and above housing 25 in the combination of Figs. 1 and 2. Its housing 25a is secured similarly to the top of casing 20 over the radial rotary bearings 27 upon which stub shaft 26 is mounted to turn, and an inlet 22 is provided into the housing to lead oil or other coupling liquid into the vortex chamber of the hydraulic coupling. The speed control mechanism in Fig. 3, however, differs in its form of construction and operation from the control mechanism in Figs. 1 and 2, although it embodies similar principles and can be used in similar combinations.

The housing 25a in Fig. 3 is of cylindrical form. Extending upwardly into it is a small axial shaft 36a which is connected for rotation with the driven shaft of the machine in the manner of shaft 36 in Fig. 2. The upper end of this small shaft is supported in a bearing hub 60 fixed to the end plate or cap 61 of the housing 25a. Below this bearing support shaft 36a carries a spider 62 holding a surrounding rotary ring 63, which also rotates with the driven shaft of the machine. This ring in turn carries an inner race 64 of a set of rotary radial bearings 65 which are shown as ball bearings and which have an outer race 66 carried by an annular skirt 67 of a rotary valve member 68 having valve ports 69.

Valve member 68 is positioned for limited angular movement within the housing 25a, being formed with an inwardly extended annular flange or web 70 having an arcuate slot 71 into which extends a pin 72 fixed to the housing structure so as to limit the extent of angular valve movement. Adjacent the inner surface of member 68 the end cap 61 has a depending wall 73 formed with radial ports 74. Surrounding member 68 the housing 25a has an annular chamber 75 to receive liquid from the inlet 22. The ports 69 and 74 are so arranged that they register with each other when the valve member 68 is at one limit of its angular movement, so as to admit oil from chamber 75 into an inner chamber 76 inside wall portion 73, thence into the hydraulic coupling below; and when the valve member is positioned at the other limit of its angular movement, the ports 69 and 74 are out of registry so that the passage of liquid from chamber 75 into chamber 76 and thence to the hydraulic coupling is then blocked by the valve member and its cooperating wall portion 73. Thus, the one position of the angularly reciprocable valve member corresponds to a condition of effective torque transmission in the controlled machine, while at its other position the torque transmission is interrupted; and these positions of the valve member are determined by the position of the angularly reciprocable control element constituted by the outer bearing race 66.

It will be noted that the stub shaft 26 carries on its upper end another inner rotary bearing race 80, which rotates with and at the speed of the driving shaft 7 and driving motor 6, and in which another set of rotary radial bearings 81 is seated. These bearings thus are rolled around the axis of shaft 26 at an angular speed proportional to the speed of the driving motor. Their outer race 82 is supported by the housing structure 25a, which has an inward flange 83 against which a spacer ring 84 and outer race 82 are thrust by a spring 85 compressed between a base ring 86 on the shaft 26 adjacent bearing 27 and thrust rings 87 and 88 on that shaft adjacent inner race 80. The bearing system 80—81—82 thus is held in its proper operative position, and yet is easily removable upon removal of housing 25a.

The bearing set 65, rotated with shaft 36a, and the bearing set 81, rotated with shaft 26, are interconnected for movement together about their common axis, by means of an annular rotary bearing cage 89 having a lower set of fingers 90 extending respectively between the adjacent bearings 81 to engage them and having an upper set of fingers 91 extending respectively between the adjacent bearings 65 to engage those bearings. In this way a slip connection is achieved, by which the two sets of bearings may be rotated about their common axis at the same angular speed even though their respective driving elements 64 and 80 tend to rotate them at differential speeds.

The reciprocable outer bearing race 66 is adapted to be removed from its bearings 65 by having its lower shoulder cut away to form a cylindrical surface 66a, which leaves an upper shoulder 66b to bear against the balls. The thrust imposed through this shoulder determines the force or reaction of the control mechanism under conditions of differential speeds induced to the two bearing sets from their respective driving elements, and this thrust is controlled by mounting element 66 and its connected valve member 68 for limited axial movement, as well as limited angular movement, and pressing them downward against the bearings 65 under the force of compression springs 92 and 93. These springs are compressed between a spider plate 94, whose arms 95 bear downward against the flange 70 of member 68, and an annular base 96 supported on an anti-friction bearing unit 97 for free angular movement with the valve member about the fixed hub 60. The coupling oil admitted to chamber 76 from chamber 75 passes downward between the arms 95 into hollow stub shaft 26 and thence into the hydraulic coupling below.

In the operation of this second embodiment, there is a certain ratio of the speeds of shafts 36a and 26 and their respective driving races 64 and 80 at which the angular speeds induced to their respective sets of bearings 65 and 81, about their common axis, are the same. That is the maximum speed ratio established for the operation of the driven machine, and when the controlling speed of the driving motor and shaft 26 is substantially constant, as is preferred in the illustrated combination, that ratio results in a predetermined maximum speed below the motor speed for the driven machine and shaft 36a.

At speeds of shaft 36a below that ratio, race 80 tends to rotate its bearings 81, and they in turn rotate cage 89 and bearings 65 about the common axis, at an angular speed greater than that induced to bearings 65 by race 64. Under this condition the angular velocity component imparted to those bearings by the cage, as indicated by arrow $V_1$ in diagram Fig. 8, is greater than the angular velocity component $V_2$ imparted thereto by race 64, so that the bearings 65 are then rolled about their own centers on race 64 in direction $D_1$, with a force proportional to their friction against shoulder 66b which is sufficient to move and hold element 66 to the one limit A of its angular movement, where the valve ports 69 and 74 are held open and torque is transmitted to the driven machine through the hydraulic coupling.

When, on the other hand, the speed of shaft 36a exceeds the said ratio, race 64 tends to rotate its bearings 65 about the common axis at a speed greater than the speed imparted to them by the cage 89 from bearings 81, race 80 and shaft 26. The angular velocity component $V_1$ (Fig. 8) as imparted from the cage fingers 91 is then exceeded by the angular velocity component $V_3$ imparted from race 64, so that the bearings 65 then are rotated about their own centers in a direction $D_2$, oppositely to the direction induced under the condition first described. They then move and hold element 66 to the other limit B of its angular movement, where the valve ports 69 and 74 are held closed and where the torque transmission from the driving system to the driven machine is interrupted, until the speed of the machine conforming to said ratio is restored.

It will be understood that suitable means will be provided for starting and stopping the torque transmission to the machine at any time or in any manner desired, for which purpose there may be another control valve (not shown) in the liquid supply system for the hydraulic coupling 10, or another means of control of the valve shown; or a switch may be provided for energizing and deenergizing the driving the driving motor 10.

The principles, features and combinations herein disclosed and claimed as my invention may be embodied in many forms of construction and are not restricted, except as a fair interpretation of the claims may require, to the exemplary forms described above and illustrated in the drawings.

I claim:

1. A speed-responsive control mechanism comprising two rotary elements adapted to be rotated at varying ratios of speed, relatively rotatable parts rotated by the respective rotary elements in the same direction about a common axis, means independent of said elements mechanically interconnecting said parts and whereby said parts tend to rotate together in the same direction at the same angular speed about said axis, said interconnecting means comprising a frictional mechanical coupling directly connecting said relatively rotatable parts which enables but imposes a definite resistance against differential rotation of said parts, so that a vector results in at least one of said parts in either one direction or the opposite direction according to whether the speed induced to one of said parts by its respective rotary element is smaller or greater than the speed induced thereto through said interconnecting means, and means engaged by at least one of said parts and shiftable to a limited extent thereby in response to such vector so as to assume one controlling position when the ratio of the speed of said one element to the speed of the other element is below a certain value and another controlling position when said ratio exceeds said value.

2. A speed-responsive control mechanism comprising two independently rotatable pinions having helical teeth, two relatively rotatable coaxial gears respectively having helical teeth in mesh with the teeth of said pinions, interconnecting means for said gears by which they tend to rotate at the same angular speed but remain relatively rotatable when driven differentially with sufficient force by the respective pinions, so that a linear vector results between said meshing helical teeth in either one direction or an opposite direction according to whether the speed induced to one of said gears by its pinion is smaller or greater, respectively, than the speed induced thereto through said interconnecting means, and means mounting at least one of the meshing toothed parts for axial reciprocation so that said vector positions it differently according to the direction of said vector.

3. A speed-responsive control mechanism comprising two coaxial, independently rotatable shafts each carrying a pinion having helical teeth, an arbor disposed substantially parallel to said shafts, means to mount said arbor for limited axial movement, two relatively rotatable ring gears carried coaxially on said arbor and respectively having helical teeth in mesh with the teeth of said pinions, one set of said meshing teeth being slanted oppositely to the other set, and means frictionally to interconnect the two ring gears so that they tend to rotate together and require a substantial torque from their respective pinions for relative rotation, whereby an axially directed vector acting to dispose said arbor at one limiting position results from said meshing teeth when the speed of one of said gears is below the speed of the other and a similar but oppositely directed vector acting to dispose said arbor at another limiting position results when the speed of said one gear exceeds the speed of the other.

4. A speed-responsive control mechanism comprising two coaxial independently rotatable driving elements each carrying an inner bearing race, outer bearing races spaced from the respective inner races, one of said outer races being mounted for limited angular movement, two sets of rotary radial bearings confined between the respective inner and outer bearing races, a rotary cage having spaced sets of fingers to engage the bearings of the respective bearing sets so that said bearing sets rotate together about their common axis, and a control element positioned by angular movement of said one race, said one race being held at one position by a directional rolling of the bearings it confines when such bearings are rotated about said axis by said cage at peripheral speeds greater than the peripheral speed of their inner race, and said one race being moved to another position by an oppositely directed rolling of such bearings when the peripheral speed of their inner race exceeds that imparted to them by said cage.

5. A speed-responsive control mechanism comprising two coaxial independently rotatable driving elements each carrying an inner bearing race, outer bearing races spaced from the respective inner races, one of said outer races mounted for limited angular movement, two sets of rotary radial bearings confined between the respective inner and outer bearing races, a rotary cage having spaced sets of fingers to engage the bearings of the respective bearing sets so that said bearing sets rotate together about their common axis, said one race adapted also for limited axial movement relative to the bearings it confines and having yieldable means to thrust it axially against such bearings with a predetermined force, and a controlling element positioned by angular movement of said one race, said one race being held at one position by a directional rolling of the bearings it confines when such bearings are rotated about said axis by said cage at peripheral speeds greater than the peripheral speed of their inner race, and said one race being moved to another position by an oppositely directed rolling of such bearings when the peripheral speed of their inner race exceeds that imparted to them by said cage.

6. In a driving system for a heavy centrifugal machine or the like, the combination of a driven shaft, rotary driving means including a rotary driving shaft connected in driving relation with said driven shaft, control means including a device shiftable to discontinue the action of said driving means, and speed responsive control mechanism for shifting said device comprising one rotary element rotated with said driven shaft, another rotary element rotated at a controlling speed, relatively movable parts rotated by the respective rotary elements in the same direction about a common axis, interconnecting means for said parts through which they tend to rotate each other in the same direction at the same angular speed about said axis, said interconnecting means comprising a frictional connection between said relatively movable parts to enable slipping therebetween, so that a vector results in said mechanism in either one direction or the opposite direction according to whether the speed induced to one of said parts by its respective rotary element is smaller or greater than the speed induced thereto through said interconnecting means, and means engaged by at least one of said parts and shiftable thereby in response to such vector for positioning said shiftable device so that said driving means may be effective at speeds of said driven shaft below a predetermined ratio to said controlling speed and so that said driving means is rendered ineffective when the speed of said driven shaft exceeds said ratio.

7. In a driving system for a heavy centrifugal machine, or the like, the combination of a rotary driven shaft, rotary driving means including a driving shaft and a torque transmission including a slip coupling to interconnect said shafts so that their relative speeds vary with load conditions, transmission control means including a device movable to a position at which said coupling is rendered inactive so as to disconnect said shafts, and mechanism driven by and responsive to the differential speeds of said shafts to move said device to said position when the speed of the driven shaft exceeds a predetermined ratio to the speed of the driving shaft, said mechanism comprising relatively movable parts, respective rotary means for rotating said parts and connected respectively with said shafts for rotation thereby, interconnecting means for said parts through which they tend to rotate each other together about a common axis at the same speed, said interconnecting means comprising a frictional connection between said relatively movable parts to enable slipping therebetween, so that a vector results in said mechanism in either one direction or the opposite direction according to whether the speed induced to one of said parts by its respective rotary means is smaller or greater than the speed induced thereto through said interconnecting means, and means engaged by at least one of said parts and shiftable thereby in response to such vector for positioning said control device.

8. In a cyclically operated centrifugal machine including a driven shaft connected with the centrifugal basket, a driving motor having a rotary driving shaft and a torque transmission consisting essentially of a slip coupling to interconnect said shafts, transmission control means including means connected with said coupling having a device movable to a position at which said coupling is rendered ineffective, and mechanism driven by and responsive to the differential speeds of said shafts to move said device to said position when the speed of the basket exceeds a predetermined ratio to the motor speed.

9. In a cyclically operated centrifugal machine including a driven shaft connected with the centrifugal basket, a motor to drive the same having a driving shaft rotated at a substantially constant speed, a torque transmission to interconnect said shafts consisting essentially of a hydraulic coupling, said coupling having liquid discharge means and liquid supply means including a control valve movable to render it ineffective, a control device movable to open and to close said valve, and mechanism driven by and responsive to the differential speeds of said shafts to position said device so that said valve is open at desired operating speeds of the basket and is closed whenever the basket speed exceeds a predetermined ratio to the motor speed.

10. In a cyclically operated centrifugal machine including a driven shaft connected with the centrifugal basket, a motor to drive the same having a driving shaft rotated at a substantially constant speed, a torque transmission to interconnect said shafts including a hydraulic coupling, said coupling having liquid discharge means and liquid supply means including a control valve movable to render it ineffective so as to disconnect said shafts, and a control device to open and to close said valve, a mechanism driven by and responsive to the differential speeds of said shafts to position said device so that said valve is open at desired operating speeds of the basket and is closed when the basket speed exceeds a predetermined ratio to the motor speed, said mechanism comprising relatively movable parts each rotated by rotary means connected with one of said shafts, interconnecting means for said parts through which they tend to rotate each other together about a common axis at the same angular speed, said interconnecting means comprising a frictional connection between said relatively movable parts to enable slipping therebetween, so that a vector results in said mechanism in either one direction or the opposite direction according to whether the speed induced to one of said parts by its respective rotary means is smaller or greater than the speed induced thereto through said interconnecting means, and means engaged by at least one of said parts and shiftable thereby in response to such vector for positioning said control device.

11. In a centrifugal machine comprising a suspended basket-carrying spindle, an electric motor having a hollow driving shaft mounted in vertical position above said spindle, a driven shaft extending through said hollow driving shaft and connected from its lower end with said spindle, a hydraulic coupling mounted at the top of said motor having impeller and runner elements connected, respectively, with said driving shaft and said driven shaft and having liquid discharge ports, a liquid supply system for said coupling including a supply valve and a control device movable to open and close said valve, said control device disposed above said hydraulic coupling, a hollow shaft secured to and extending above said impeller to rotate with said driving shaft, and another shaft connected to rotate with said driven shaft and extending vertically through said hollow shaft, a speed control mechanism including rotary elements connected respectively for rotation with the two last-recited shafts, relatively rotatable parts rotated respectively by said rotary elements and about a common axis, means interconnecting said parts for inducing them to rotate together about said axis at the same angular speed, said interconnecting means comprising a frictional connection between said relatively movable parts to enable slipping therebetween, so that a vector results therein in one or the opposite direction according to whether the speed induced to one of said parts by its respective rotary element is greater or less than the speed induced thereto through said inter-connecting means, and means engaged by at least one of said parts and shiftable thereby in response to such vector to move said control device to close said valve when the speed of said spindle exceeds a predetermined ratio to the speed of said motor.

12. In a cyclically operated centrifugal machine including a driven shaft connected with a centrifugal basket, driving means comprising a driving shaft coaxial with said driven shaft, a slip coupling to interconnect said shafts, and drive control means comprising a control drive shiftable to interrupt the action of said driving means, a speed control mechanism comprising coaxial shaft extensions connected respectively for rotation with said driven and driving shafts, rotary control driving elements on the respective extensions, relatively rotatable parts rotated respectively by said control elements, means interconnecting said parts for inducing them to rotate together about said axis at the same angular speed, said interconnecting means comprising a frictional connection between said relatively movable parts to enable slipping therebetween, so that a vector results therein in either one or the opposite direction according to whether the speed induced to one of said parts by its respective rotary element is greater or less than the speed induced thereto through said interconnecting means, and means engaged by at least one of said parts and shiftable thereby in response to such vector to move said control device to interrupt the action of said driving means when the speed of said driven shaft exceeds a predetermined ratio to the speed of said driving shaft.

13. In a cyclically operated centrifugal machine including a driven shaft connected with a centrifugal basket, driving means comprising a driving shaft coaxial with said driven shaft, a slip coupling to interconnect said shafts, and drive control means comprising a control device shiftable to interrupt the action of said driving means, a speed control mechanism comprising coaxial shaft extensions connected respectively for rotation with said driven and driving shafts, a rotary control driving pinion on each of said extensions, each pinion having helical teeth and the teeth of one pinion being slated oppositely to the teeth of the other, an arbor disposed substantially parallel to said extensions and movable axially to position said control device, two relatively rotatable ring gears carried coaxially on said arbor and respectively having helical teeth in mesh with teeth of said pinions, and means frictionally interconnecting the two ring gears so that they tend to rotate together and require a substantial torque from their respective pinions for relative rotation, whereby an axially directed vector acting to dispose said arbor at one limiting position results when the speed of one of said gears is below the speed of the other and a similar but oppositely directed vector acting to dispose said arbor at another limiting position results when the speed of said one gear exceeds the speed of the other.

References Cited in the file of this patent

UNITED STATES PATENTS

| | | |
|---|---|---|
| 865,082 | Cassel | Sept. 3, 1907 |
| 1,749,569 | De Florez | Mar. 4, 1930 |
| 2,004,019 | Swetenham | June 4, 1935 |
| 2,018,616 | Martyrer et al. | Oct. 22, 1935 |
| 2,049,673 | Starr | Aug. 4, 1936 |
| 2,072,246 | Davis | Mar. 2, 1937 |
| 2,091,356 | Fawcett | Aug. 31, 1937 |
| 2,123,344 | Rogers | July 12, 1938 |
| 2,380,595 | Hertrich | July 31, 1945 |